(No Model.)
L. HERZ.
TOOL FOR SQUARING MORTISES.
No. 364,647. Patented June 14, 1887.
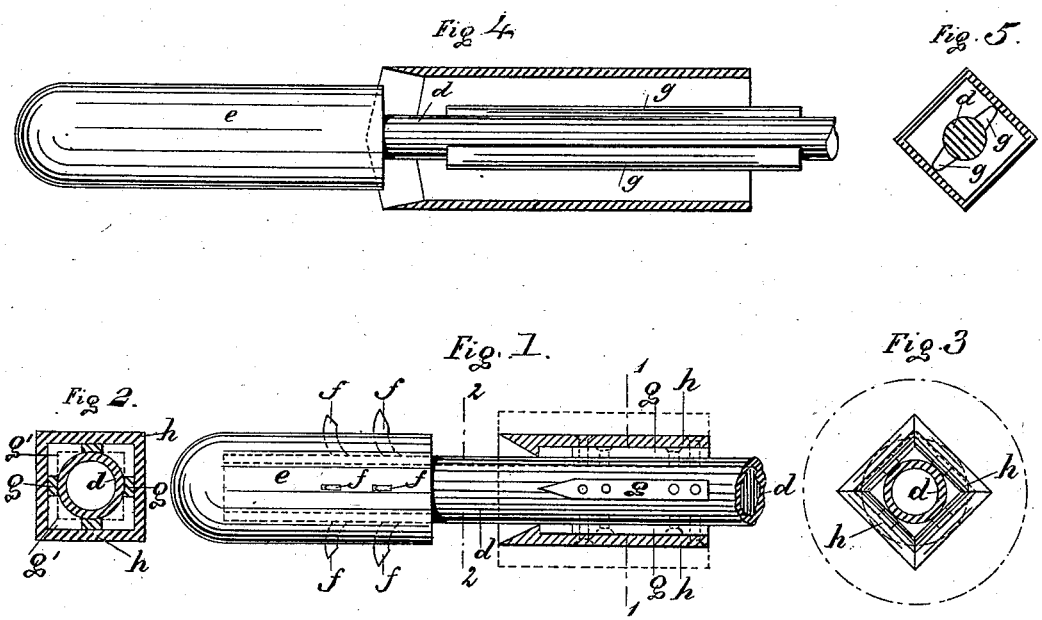
Witnesses:
Alfred Jonghmans
Edward Fuck
Inventor:
Ludwig Herz
per Roeder & Bricker
Attorneys.

UNITED STATES PATENT OFFICE.

LUDWIG HERZ, OF GMUND, BAVARIA, GERMANY.

TOOL FOR SQUARING MORTISES.

SPECIFICATION forming part of Letters Patent No. 364,647, dated June 14, 1887.

Application filed December 29, 1886. Serial No. 222,870. (No model.)

*To all whom it may concern:*

Be it known that I, LUDWIG HERZ, a citizen of Germany, residing at Gmund, in the Kingdom of Bavaria, Germany, have invented a new and useful Improvement in Tools for Squaring Mortises, of which the following is a specification.

My invention relates to a tool for making square holes in wood; and it consists in the construction of the same, fully described in the following specification.

In the accompanying drawings, Figure 1 is a longitudinal section of the plane. Fig. 2 is a cross-section of the same on line 1 1, Fig. 3. Fig. 3 is a cross-section on line 2 2, Fig. 3. Fig. 4 represents a longitudinal section of a plane showing a modification, and Fig. 5 is a cross-section of the same.

Into the wooden block or roller A a round hole is first made, corresponding in size to the sides of the square of the required square hole to be made into said block or roller, when the corners are planed, first roughly formed by another tool before using the tool to which this application relates; or the square hole may be planed out directly after the round hole has been made by my improved tool at one operation.

My improved tool consists of a head, $e$, of a size corresponding to the diameter of the hole bored into the block A, to act as a guide, and attached to a rod, $d$, for operating the same. Some distance behind the head $e$ strips or bars $g$ are attached to the rod $d$, upon which the cutters $h$ are fastened. The cutters form a square of the desired size of the required hole, having their cutting-edges near the sides of the head $e$. The shavings pass through the open space $g'$ between the bars $g$. On the head $e$ cutters $ff$ are arranged, placed square to each other on the head, to cut the corners of the hole preparatory to the entering of the cutters $h$. The cutters $ff$ may be dispensed with, as shown in Fig. 6.

What I claim is—

The combination of rod $d$ with head $e$, bars $g'$, attached to the bar $d$, and cutters $h$, forming a square, the head $e$ being attached to rod $d$ in advance of the cutters, substantially as and for the purpose described.

LUDWIG HERZ.

Witnesses:
G. DEDREUX,
A. MEICKMAN.